United States Patent
Ahn

(10) Patent No.: US 11,871,285 B2
(45) Date of Patent: Jan. 9, 2024

(54) HANDOVER PROCESSING METHOD BASED SLICE AND DEVICE FOR PERFORMING THE METHOD

(71) Applicant: ELECTRONICS AND TELECOMMUNICATIONS RESEARCH INSTITUTE, Daejeon (KR)

(72) Inventor: Byungjun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 157 days.

(21) Appl. No.: 17/484,238

(22) Filed: Sep. 24, 2021

(65) Prior Publication Data

US 2022/0095175 A1    Mar. 24, 2022

(30) Foreign Application Priority Data

Sep. 24, 2020 (KR) .................. 10-2020-0124052
Sep. 24, 2020 (KR) .................. 10-2020-0124063
Sep. 24, 2021 (KR) .................. 10-2021-0126391
Sep. 24, 2021 (KR) .................. 10-2021-0126427

(51) Int. Cl.
    *H04W 36/00* (2009.01)
(52) U.S. Cl.
    CPC ................ *H04W 36/0055* (2013.01)
(58) Field of Classification Search
    CPC ..... H04W 48/18; H04W 36/08; H04W 36/14; H04W 36/0055; H04W 36/0033; H04W 36/0072; H04W 36/0016; H04W 36/0011; H04W 36/12; H04W 36/06; H04W 8/08; H04W 36/26
    See application file for complete search history.

(56) References Cited

U.S. PATENT DOCUMENTS

| | | | |
|---|---|---|---|
| 10,412,741 B2 | 9/2019 | Lee et al. | |
| 10,425,830 B2 | 9/2019 | Song et al. | |
| 2019/0191348 A1* | 6/2019 | Futaki | H04W 36/0033 |

(Continued)

FOREIGN PATENT DOCUMENTS

KR    1020190117648 A    10/2019

OTHER PUBLICATIONS

CATT, R3-205362, Discussion on Xn based handover slice re-mapping, 3GPP TSG RAN WG3 #109-E, 3GPP (Aug. 7, 2020).

(Continued)

*Primary Examiner* — Allahyar Kasraian
(74) *Attorney, Agent, or Firm* — Rabin & Berdo, P.C.

(57) ABSTRACT

Disclosed is a method of ensuring a service continuity based on a utility slice in case of a handover. The method includes receiving a handover request message from a source base station when a user equipment (UE) moves from a coverage of the source base station to that of a target base station, setting a session for the UE based on slice information included in the handover request message, and transmitting a handover request acknowledgment (ACK) message for the handover request message to the source base station, wherein the target base station may provide, when a service slice corresponding to a service provided from the source base station to the UE through a protocol data unit (PDU) session is not supported by the target base station, the service using a utility slice.

20 Claims, 5 Drawing Sheets

(56) References Cited

U.S. PATENT DOCUMENTS

| | | | |
|---|---|---|---|
| 2019/0342937 A1 | 11/2019 | Salkintzis | |
| 2019/0356450 A1* | 11/2019 | He | H04W 72/20 |
| 2020/0022033 A1 | 1/2020 | Wei et al. | |
| 2020/0137639 A1* | 4/2020 | Yuan | H04W 36/00 |
| 2022/0217625 A1* | 7/2022 | Zhu | H04W 36/32 |
| 2022/0330117 A1* | 10/2022 | Li | H04W 36/0055 |
| 2023/0014464 A1* | 1/2023 | Fu | H04W 76/10 |
| 2023/0054991 A1* | 2/2023 | Zhu | H04W 48/16 |
| 2023/0056120 A1* | 2/2023 | Fu | H04W 36/12 |

OTHER PUBLICATIONS

Ericsson, R3-170195, "Solution for slice access management in UE registration areas", 3GPP TSG RAN WG3 #Ad Hoc, 3GPP (Jan. 11, 2017).

Ericsson, R3-171143, "Slice re-mapping or removal during mobility", 3GPP TSG RAN WG3 #95bis, 3GPP (Mar. 25, 2017).

Michele Polese et al., "Improved Handover Through Dual Connectivity in 5G mmWave Mobile Networks", IEEE JSAC, Jul. 17, 2017, pp. 1-16.

Huawei, "Further Discussion on Slice Re-mapping", Discussion and Decision, 3GPP TSG-RAN WG3 95bis Spokane, Washington, USA, Apr. 3-7, 2017, R3-171251.

ZTE, "Selection RAN Part Network Slice during UE mobility", Discussion and Approval, 3GPP TSG RAN WG3 NR-adhoc Spokane, USA, Jan. 17-19, 2017, R3-170065.

\* cited by examiner

<Mapping table>

Handover (CASE 1)

| Cell 1 | | Cell 2 | |
|---|---|---|---|
| gNB1 | UE | gNB2 | UE |
| Slice 1 | Slice 1 | Slice 1 | Slice 1 |
| Slice 2 | Slice 2 | Slice 4 | |
| Slice 3 | | Slice 5 | |
| Slice X | | Slice X | Slice X-Slice 2 |

Handover (CASE 2)

| Cell 2 | | Cell 3 | |
|---|---|---|---|
| gNB2 | UE | gNB3 | UE |
| Slice 1 | Slice 1 | Slice 1 | Slice 1 |
| Slice 4 | | Slice 2 | Slice 2 |
| Slice 5 | | Slice 3 | |
| Slice X | Slice X-Slice 2 | Slice X | |

HANDOVER PROCESSING METHOD BASED SLICE AND DEVICE FOR PERFORMING THE METHOD

CROSS-REFERENCE TO RELATED APPLICATIONS

This application claims the benefit of Korean Patent Application No. 10-2020-0124052 filed on Sep. 24, 2020, Korean Patent Application No. 10-2020-0124063 filed on Sep. 24, 2020, Korean Patent Application No. 10-2021-0126391 filed on Sep. 24, 2021, and Korean Patent Application No. 10-2021-0126427 filed on Sep. 24, 2021, in the Korean Intellectual Property Office, the entire disclosures of which are incorporated herein by reference for all purposes.

BACKGROUND

1. Field of the Invention

One or more example embodiments relate to a method of processing a handover in consideration of a utility slice, when a slice set by a user equipment (UE) for a session is not supported by a target base station in case of a handover between base stations.

2. Description of the Related Art

Network slicing for efficiently providing various services with different characteristics using one 5G system including radio access networks (RANs) and a core network while satisfying the quality of service (QoS) of each service needs to be applied all from UEs to end-to-end sections to provide a separate dedicated network for each slice. Although various network functions included in 5GC, the core network of 5G, may be implemented in the form of software on a hardware platform, RAN slicing has been studied relatively less, and it is much complex and difficult to technically implement the network slicing technique in accordance with its concept when compared to the core network.

SUMMARY

Example embodiments provide a method of ensuring a service continuity based on a utility slice in case of a handover.

According to an aspect, there is provided a method of ensuring a service continuity, the method including receiving a handover request message from a source base station when a user equipment (UE) moves from a coverage of the source base station to that of a target base station, setting a session for the UE based on slice information included in the handover request message, and transmitting a handover request acknowledgment (ACK) message for the handover request message to the source base station.

The target base station may provide, when a service slice corresponding to a service provided from the source base station to the UE through a protocol data unit (PDU) session is not supported by the target base station, the service using a utility slice. The target base station may provide, when the service slice corresponding to the service provided from the source base station to the UE through the PDU session is supported by the target base station, the service using the service slice.

The handover request message may include, when the service slice related to the service provided from the source base station to the UE through the PDU session is not supported by the target base station, an identifier indicating that the service slice is not supported by the target base station.

The target base station may maintain the service to the UE by replacing a session for the service slice with a session for the utility slice.

The session for the utility slice may be provided to the UE through a utility data radio bearer (DRB) set by the target base station.

The handover request ACK message may include a list of PDU sessions admitted by the target base station, and the service slice may be included in the list of admitted PDU sessions, when the service slice related to the service provided from the source base station to the UE through the PDU session is not supported by the target base station.

According to an aspect, there is provided a method of ensuring a service continuity, the method including transmitting a handover request message to a target base station when a UE moves from a coverage of a source base station to that of the target base station, and receiving a handover request ACK message for the handover request message from the target base station.

The target base station may provide, when a service slice corresponding to a service provided from the source base station to the UE through a PDU session is not supported by the target base station, the service using a utility slice.

The target base station may provide, when the service slice corresponding to the service provided from the source base station to the UE through the PDU session is supported by the target base station, the service using the service slice.

The handover request message may include, when the service slice related to the service provided from the source base station to the UE through the PDU session is not supported by the target base station, an identifier indicating that the service slice is not supported by the target base station.

The target base station may maintain the service to the UE by replacing a session for the service slice with a session for the utility slice.

The session for the utility slice may be provided to the UE through a utility DRB set by the target base station.

The handover request ACK message may include a list of PDU sessions admitted by the target base station, and the service slice may be included in the list of admitted PDU sessions, when the service slice related to the service provided from the source base station to the UE through the PDU session is not supported by the target base station.

Additional aspects of example embodiments will be set forth in part in the description which follows and, in part, will be apparent from the description, or may be learned by practice of the disclosure.

According to example embodiments, even when a slice corresponding to a protocol data unit (PDU) session maintained in a user equipment (UE) before a handover is not supported by a target base station after the handover it is possible to continuously maintain the PDU session through a utility slice.

According to example embodiments, since a PDU session provided through a slice not supported by a target base station before a handover is continuously provided through a utility data radio bearer (DRB) corresponding to a utility slice, it is possible to ensure a continuity of a service provided to a UE even when a handover occurs.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
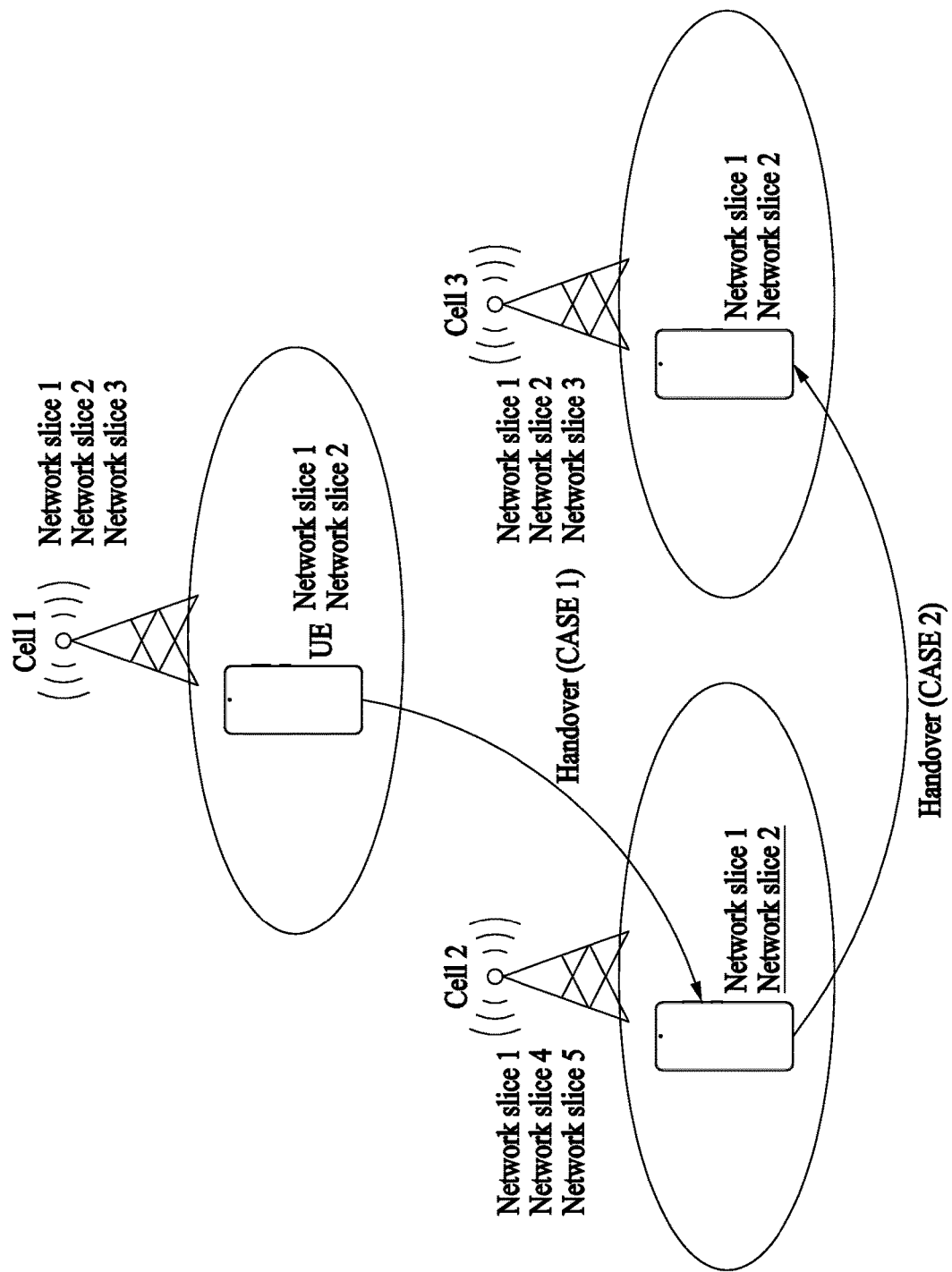
FIG. 1 illustrates base stations performing a handover and a user equipment (UE) according to an example embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 illustrates base stations performing a handover and a user equipment (UE) according to an example embodiment.

Referring to FIG. 1, when a UE moves from a coverage of Cell 1 (gNB1) to a coverage of Cell 2 (gNB2), a handover occurs (CASE 1). When the UE moves from the coverage of Cell 2 (gNB2) to a coverage of Cell 3 (gNB3), a handover occurs (CASE 2).

A case in which a handover of CASE 1 occurs as the UE moves from the coverage of the source base station gNB1 to the coverage of the target base station gNB2 will be described. In this case, it is assumed that a service is provided to the UE through PDU sessions corresponding to slices 1 and 2 in the coverage of the source base station gNB1. When a handover of CASE 1 occurs as the UE moves to the target base station gNB2 supporting slices 1, 4 and 5 while the service is provided to the UE through the PDU sessions corresponding to the slices 1 and 2, the PDU session corresponding to the slice 1 supported by the target base station gNB2 may be maintained as it is, whereas the PDU session corresponding to the slice 2 not supported by the target base station gNB2 should be released.

The present disclosure provides a method of a UE connecting to a base station using a utility slice, when a slice corresponding to a session maintained in the UE is absent from a list of slices supported by a target base station gNB in a handover process. The utility slice may be a default slice technically supportable by all base stations.

Specifically, to enable the UE to initially connect to the target base station gNB2 when a handover of CASE 1 occurs, the source base station gNB1 may transmit a handover request message with an identifier added, the identifier indicating that the slice 2 is a utility slice, to the target base station gNB2. Then, a PDU session corresponding to the slice 2 not supported by the target base station gNB2 may be maintained through a utility data radio bearer (DRB) related to a utility slice preset in the target base station gNB2.

In addition, it may be assumed that when a handover of CASE 2 in which the UE moves from the coverage of the base station gNB2 to the coverage of the base station gNB3 occurs, the target base station gNB3 for the handover of CASE 2 supports slices 1, 2 and 3. In this case, a session for the slice 1 is continuously maintained for the UE. A PDU session for the slice 2 maintained by the source base station gNB2 for the handover of CASE 2 is continuously maintained in the target base station gNB3 as well.

However, the PDU session for the slice 2 maintained in the source base station gNB2 through the utility DRB is maintained through not the utility slice but a slice 2-dedicated DRB2 corresponding to the slice 2 supported by the target base station gNB3. That is, the PDU session for the slice 2 maintained in the source base station gNB2 through the utility DRB is migrated to DRB2 corresponding to the slice 2 supported by the target base station gNB3.

This will be described in detail with reference to FIGS. 2 to 5.

Figure 2:
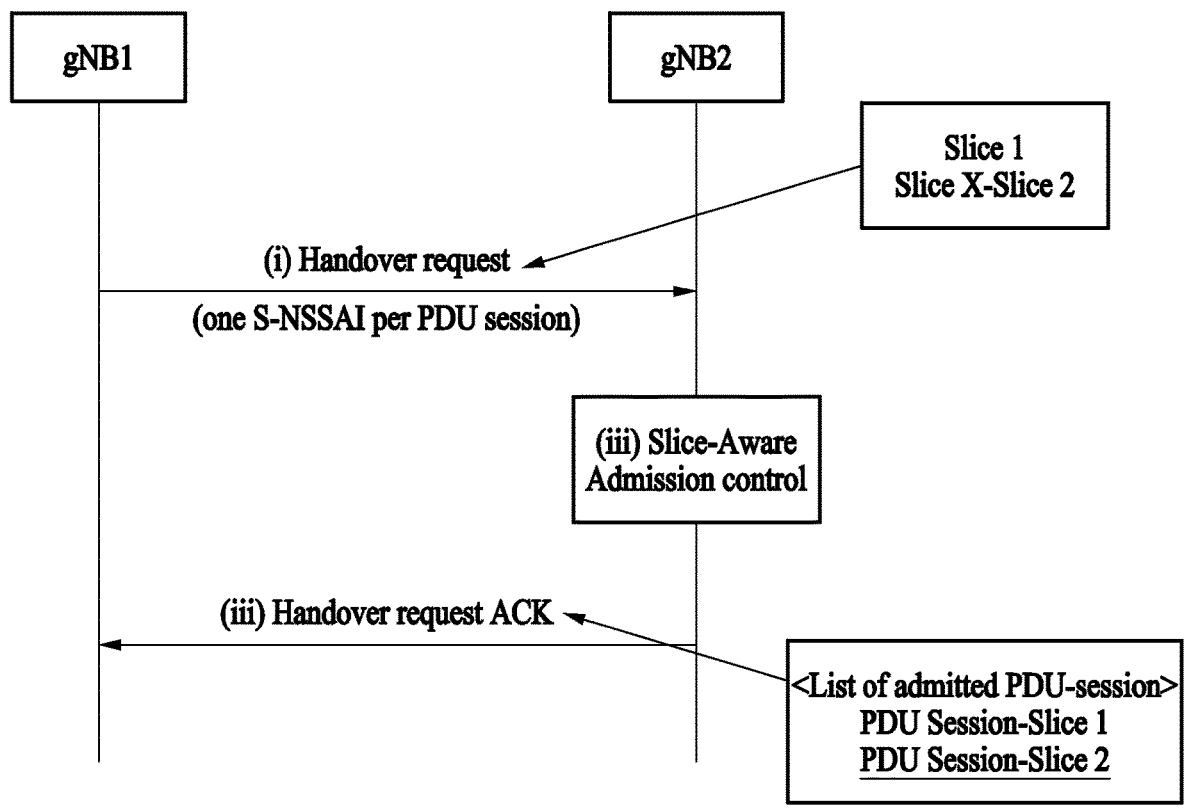
FIG. 2 is a flowchart illustrating a process of a handover between base stations according to an example embodiment.

FIG. 2 is a flowchart illustrating a process of a handover between base stations according to an example embodiment.

Referring to FIG. 2, a handover process between base stations when a handover of CASE 1 in which a UE moves from a coverage of a source base station gNB1 to a coverage of a target base station gNB2 occurs is shown. The source base station gNB1 and the target base station gNB2 may perform a procedure as in FIG. 2 to enable an initial connection of the UE.

In operation (i), the source base station gNB1 may transmit a handover request message to the target base station gNB2. As described above, it is assumed that a service is provided to the UE through a PDU session corresponding to a slice 1 and a PDU session corresponding to a slice 2 in the coverage of the source base station gNB1. In this case, it is assumed that when the UE moves to the coverage of the target base station gNB2, the target base station gNB2 supports slices 1, 4 and 5.

Even when a handover of CASE 1 occurs, the service having been provided from the source base station gNB1 through the PDU session corresponding to the slice 1 may be continuously provided to the UE through a PUD session corresponding to the slice 1 supported by the target base station gNB2.

However, even when the target base station gNB2 does not support the slice 2, the service having been provided from the source base station gNB1 through the PDU session corresponding to the slice 2 may be provided to the UE using a utility slice supported by the target base station gNB2. That is, since the slice 2 is not supported by the target base station gNB2, the target base station gNB2 may not provide the service to the UE through the slice 2. However, the target base station gNB2 may continuously maintain the service having been provided to the UE through the slice 2 in the source base station gNB1, by maintaining a session of the slice 2 in the target base station gNB2 through the utility slice.

In this case, an identifier indicating that the slice 2 is mapped to the utility slice (a slice X) may be added to the handover request message to be transmitted from the source base station gNB1 to the target base station gNB2, in operation (i). That is, when the slice corresponding to the PDU session maintained in the UE before the handover is not supported by the target base station, the source base station may transmit the handover request message with an identifier added, the identifier indicating that a service slice related to the service currently provided to the UE is mapped to a utility slice, to the target base station. At this time, the source base station is aware in advance that the slice 2 is not supported by the target base station.

In operation (ii), the target base station gNB2 may set a session for the slice X, which is the utility slice. The session for the slice 2 to provide the service to the UE is replaced with a session for the slice X. In this case, the session for the utility slice X is provided through a utility DRB set in target base station gNB. The target base station gNB2 may include the slices 1 and 2 in a list of admitted PDU sessions.

In operation (iii), the target base station gNB2 may transmit a handover request acknowledgment (ACK) message to the source base station gNB1 in response to the handover request message received from the source base station gNB1. In this case, the handover request ACK message may include the list of admitted PDU sessions including the slices 1 and 2. In this case, a core network may recognize it as the service is continuously provided through the PDU sessions for the slices 1 and 2.

Figure 3:
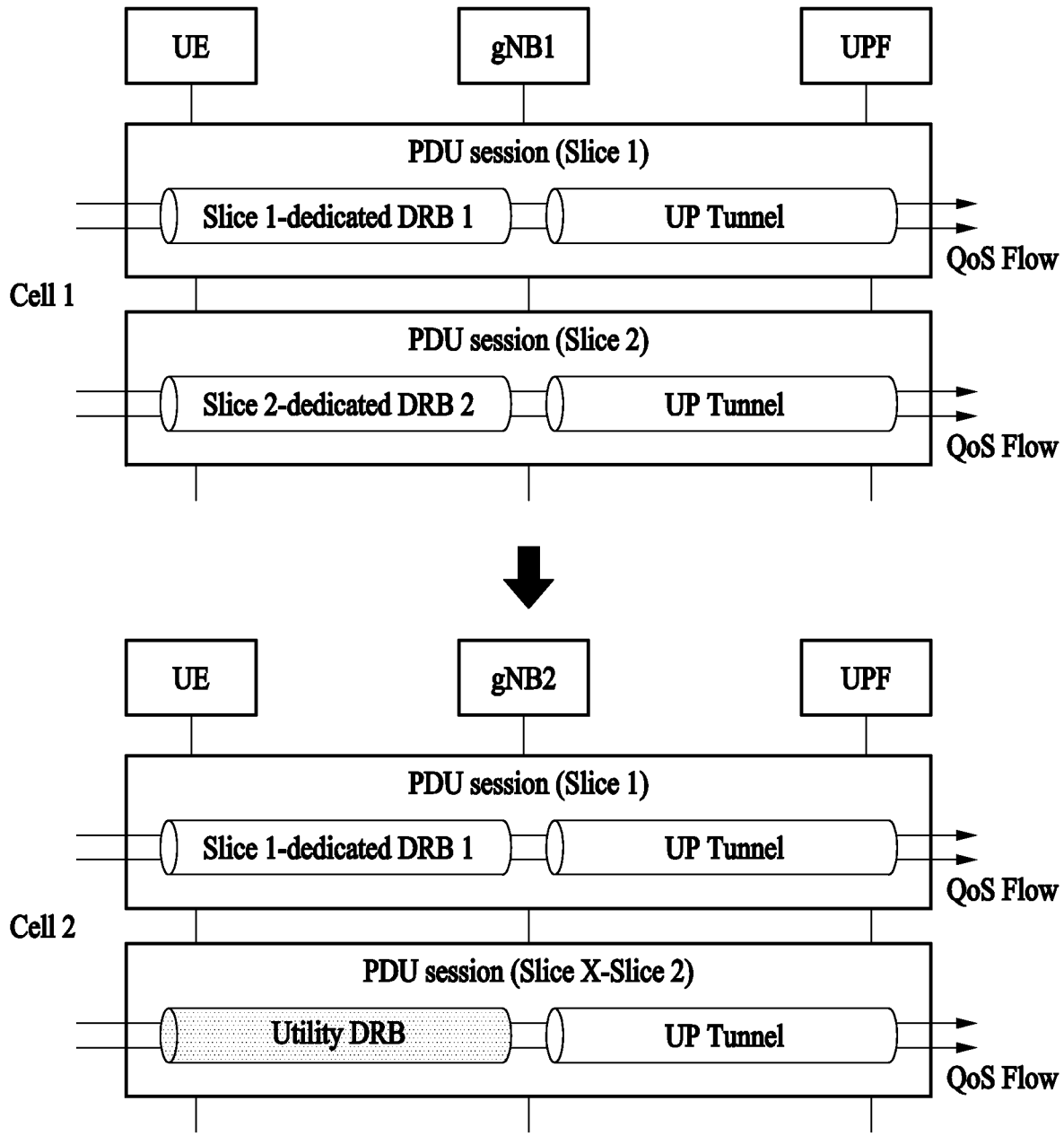
FIG. 3 is a diagram illustrating a process of setting a bearer when a handover occurs from gNB1 to gNB2 according to an example embodiment.

FIG. 3 is a diagram illustrating a process of setting a bearer when a handover occurs from gNB1 to gNB2 according to an example embodiment.

FIG. 3 shows a process of setting a bearer for a UE to initially connect to a target base station gNB2 when a handover of CASE 1 in which the UE positioned in the coverage of the source base station gNB1 moves to the coverage of the target base station gNB2 occurs, as described in FIG. 1. In the coverage (Cell 1) of the source base station gNB1, a service is provided to the UE through a PDU session corresponding to a slice 1 and a PDU session corresponding to a slice 2. At this time, between the UE and the source base station gNB1, the PDU session (PDU session 1) for the slice 1 is maintained through a slice 1-dedicated DRB1, and the PDU session (PDU session 2) for the slice 2 is maintained through a slice 2-dedicated DRB 2.

When the handover of CASE 1 occurs, the UE continuously maintains PDU session 1 through the slice 1-dedicated DRB1 corresponding to the slice 1 supported by the target base station gNB2. The target base station gNB2 does not support the slice 2. However, the service having been provided to the UE is continuously provided by the target base station gNB2 as well by maintaining PDU session 2 for the slice 2 using a utility DRB corresponding to a utility slice X.

In this case, since a quality of service (QoS) flow is continuously provided through the UE through the session for the slice 1 and the session for the slice 2, a UPF(User Plane Function) included in a core network may recognize it as the PDU session for the slice 1 and the PUD session for the slice 2 are maintained even when a handover of CASE 1 occurs.

Figure 4:
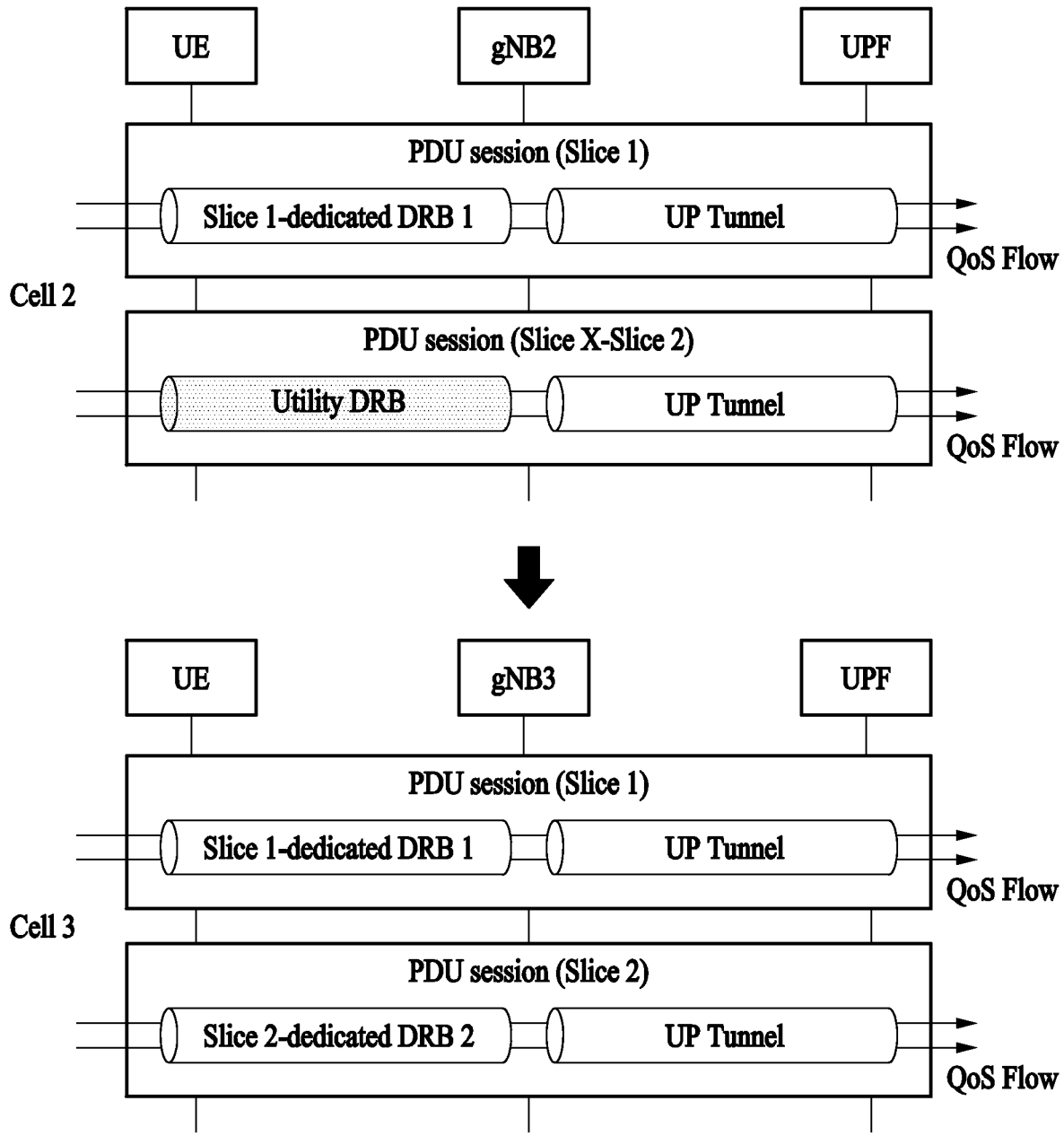
FIG. 4 is a diagram illustrating a process of setting a bearer when a handover occurs from gNB2 to gNB3 according to an example embodiment.

FIG. 4 is a diagram illustrating a process of setting a bearer when a handover occurs from gNB2 to gNB3 according to an example embodiment.

FIG. 4 shows a process of setting a bearer for a UE to initially connect to a target base station gNB3 when a handover of CASE 2 in which the UE positioned in the coverage of the source base station gNB2 moves to the coverage of the target base station gNB3 occurs, as described in FIG. 1.

In the coverage (Cell 2) of the source base station gNB2, a service is provided to the UE through a PDU session corresponding to a slice 1 and a PDU session corresponding to a slice 2 mapped to a utility slice X. At this time, between the UE and the source base station gNB2, the PDU session (PDU session 1) for the slice 1 is maintained through a slice 1-dedicated DRB1, and the PDU session (PDU session 2) for the slice 2 is maintained through a utility DRB.

When the handover of CASE 2 occurs, the UE continuously maintains PDU session 1 through the slice 1-dedicated DRB1 corresponding to the slice 1 supported by the target base station gNB3.

Since the slice 2 mapped to the utility slice X in gNB2 is supported by the target base station gNB3, the service having been provided to the UE through PDU session 2 is continuously provided by the target base station gNB3 as well.

In this case, the target base station gNB3 supports the slice 2. Thus, the PDU session for the slice 2 provided by the source base station gNB2 through the utility DRB is maintained through a slice 2-dedicated DRB2 corresponding to the slice 2 supported by the target base station gNB3. That is, the PDU session for the slice 2 mapped to the utility slice X through the utility DRB is migrated from the target base station gNB3 to the slice 2-dedicated DRB2 corresponding to the slice 2, and the PDU session for the slice 2 provided through the source base station gNB2 is continuously maintained through the slice 2-dedicated DRB2 in the target base station gNB3. In this case, since a QoS flow is continuously provided through the UE through the session for the slice 1 and the session for the slice 2, a UPF included in a core network may recognize it as the PDU session for the slice 1 and the PUD session for the slice 2 are maintained even when a handover of CASE 2 occurs.

Figure 5:
FIG. 5 is a diagram illustrating slice history information reflecting a handover according to an example embodiment.

FIG. 5 is a diagram illustrating slice history information reflecting a handover according to an example embodiment.

Referring to FIG. 5, a base station and a UE may manage slice history information indicating a mapping relationship of slices. The slice history information may be generated by the base station and then, stored and managed in each UE. The slice history information includes a history of switches of the slices and is used to check the way the slices are processed when a handover occurs.

Slice history information including results of mapping slices 1, 2 and 3 supported by a base station gNB1 and slices 1 and 2 provided to a UE may be stored in each of the base station gNB1 and the UE. When a handover of CASE 1 from the base station gNB1 to a base station gNB2 occurs, slice history information including results of mapping slices 1, 4 and 5 supported by the target base station gNB2 and the slices 1 and 2 provided to the UE to a slice X may be stored in each of the base station gNB2 and the UE. In this case, the slice X may be a utility slice, and the slice 2 may be expressed as being mapped to the slice X in the slice history information.

When a handover of CASE 1 occurs, the base station gNB1 is a source base station, and the base station gNB2 is a target base station. In this case, the source base station gNB1 supports slices 1, 2, 3 and X. In addition, a service may be provided from the source base station gNB1 to the UE through PDU sessions set through the slices 1 and 2.

At this time, when a handover of CASE 1 occurs as the UE moves from the coverage of the source base station gNB1 to the coverage of the target base station gNB2, ensuring a service continuity based on the slices is required. In particular, it is assumed that the target base station gNB2 supports slices 1, 4, 5 and X.

Then, the service having been provided from the source base station gNB1 through the slice 1 may be continuously provided to the UE from the target base station gNB2 as well through the same slice 1. Although the service has been provided from the source base station gNB1 to the UE through the slice 2, the target base station gNB2 does not support the slice 2. In this case, the target base station gNB2 may continuously maintain, through the slice X, which is a utility slice, the service having been provided from the source base station gNB1 through the slice 2. In addition, a slice mapping relationship between the slices 2 and X may be recorded in slice history information.

When a handover of CASE 2 from the base station gNB2 to a base station gNB3 occurs, results of mapping the slices 1, 2 and 3 supported by the target base station gNB3 and the slices 1 and 2 provided to the UE may be included. At this time, the slice 2 provided to the UE is a result of switching from the utility slice X.

When a handover of CASE 2 occurs, the base station gNB2 is a source base station, and the base station gNB3 is a target base station. In this case, the source base station gNB2 supports slices 1, 4, 5 and X. In addition, a service may be provided from the source base station gNB2 to the UE through PDU sessions set through the slices 1 and X.

At this time, when a handover of CASE 2 occurs as the UE moves from the coverage of the source base station gNB2 to the coverage of the target base station gNB3, ensuring a service continuity based on the slices is required. In particular, it is assumed that the target base station gNB3 supports slices 1, 2, 3 and X.

Then, the service having been provided from the source base station gNB2 through the slice 1 may be continuously provided to the UE from the target base station gNB3 as well through the same slice 1. However, the service has been provided from the source base station gNB2 to the UE through the slice X, and the slice X is mapped to the slice 2 in the slice history information. In addition, when the target base station gNB3 supports slices 1, 2 and 3, the target base station gNB3 may continuously maintain, through not the slice X but the slice 2, the service having been supported by the source base station gNB2 through the slice X.

That is, in the handover process of CASE 1, the service may be maintained through the utility slice rather than a slice not supported by the target base station. Although it is externally set that the service is maintained through the utility slice X, it may be substantially set that the service is maintained through the slice 2.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of ensuring a service continuity, performed by a target base station, the method comprising:
   receiving a handover request message from a source base station when a user equipment (UE) moves from a coverage of the source base station to a coverage of the target base station;
   setting a session for the UE based on slice information included in the handover request message; and
   transmitting a handover request acknowledgment (ACK) message for the handover request message to the source base station,
   wherein the target base station provides, when a service slice corresponding to a service provided from the source base station to the UE through a protocol data unit (PDU) session is not supported by the target base station, the service using a utility slice,
   wherein the target base station and the source base station maintain and manage a slice mapping table, where a slice mapping relationship between the service slice and the utility slice is recorded as slice history information, and
   wherein the slice history information is used in processing a handover.

2. The method of claim 1, wherein the target base station provides, when the service slice corresponding to the service provided from the source base station to the UE through the PDU session is supported by the target base station, the service using the service slice.

3. The method of claim 1, wherein the handover request message comprises, when the service slice related to the service provided from the source base station to the UE through the PDU session is not supported by the target base station, an identifier indicating that the service slice is not supported by the target base station, and
   the handover request message further comprises, a pair of the service slice and an identifier indicating that the service slice is being mapped in a utility slice of the target base station.

4. The method of claim 1,
   wherein the target base station maintains the service to the UE by replacing a session for the service slice with a session for the utility slice, and
   wherein the target base station stores that the service slice which is not supported by the target base station is being mapped in a utility slice of the target station.

5. The method of claim 4, wherein the session for the utility slice is provided to the UE through a utility data radio bearer (DRB) set by the target base station.

6. The method of claim 1, wherein the handover request ACK message comprises a list of PDU sessions admitted by the target base station, and
   the service slice is included in the list of admitted PDU sessions, when the service slice related to the service provided from the source base station to the UE through the PDU session is not supported by the target base station.

7. A method of ensuring a service continuity, performed by a source base station, the method comprising:
   transmitting a handover request message to a target base station when a user equipment (UE) moves from a coverage of the source base station to a coverage of the target base station; and
   receiving a handover request acknowledgment (ACK) message for the handover request message from the target base station,
   wherein the target base station provides, when a service slice corresponding to a service provided from the source base station to the UE through a protocol data unit (PDU) session is supported by the target base station, the service using the service slice, which was mapped to a utility slice in a current source base station,
   wherein the target base station and the source base station maintain and manage a slice mapping table, where a slice mapping relationship between the service slice and the utility slice is recorded as slice history information, and
   wherein the slice history information is used in processing a handover.

8. The method of claim 7, wherein the target base station provides, when the service slice corresponding to the service provided from the source base station to the UE through the PDU session which is mapped to the utility slice in the current source base station is supported by the target base station, the service using the service slice.

9. The method of claim 7, wherein the handover request message comprises, when the service slice related to the service provided from the source base station to the UE through the PDU session is not supported by the target base station, an identifier indicating that the service slice is not supported by the target base station, and
   the handover request message further comprises, a pair of the service slice and an identifier indicating that the service slice is being mapped in a utility slice of the target base station.

10. The method of claim 7, wherein the target base station maintains the service to the UE by restoring the PDU session, which is mapped to the utility slice in the current source station, to the service slice when the service slice is supported by the target base station, and
    wherein the target base station stores history information that the PDU session is restored to the service slice.

11. The method of claim 10, wherein the session for the service slice is provided to the UE through a service slice dedicated data radio bearer (DRB) set by the target base station.

12. The method of claim 7, wherein
the handover request ACK message comprises a list of PDU sessions admitted by the target base station, and
the service slice is included in the list of admitted PDU sessions, when the service slice related to the service provided from the source base station to the UE through the PDU session is supported by the target base station.

13. A target base station for performing a method of ensuring a service continuity, the target base station comprising:
a processor,
wherein the processor is configured to perform:
receiving a handover request message from a source base station when a user equipment (UE) moves from a coverage of the source base station to a coverage of the target base station;
setting a session for the UE based on slice information included in the handover request message; and
transmitting a handover request acknowledgment (ACK) message for the handover request message to the source base station,
wherein the target base station provides, when a service slice corresponding to a service provided from the source base station to the UE through a protocol data unit (PDU) session is not supported by the target base station, the service using a utility slice,
wherein the target base station stores a slice mapping table, where a slice mapping relationship between the service slice and the utility slice is recorded as slice history information,
wherein the slice mapping relationship comprises an identifier of the service slice provided from the source base station to the UE through a protocol data unit (PDU) session, and
wherein the slice history information is used in processing a handover.

14. The target base station of claim 13, wherein the target base station provides, when the service slice corresponding to the service provided from the source base station to the UE through the PDU session is supported by the target base station, the service using the service slice according to the slice history information for mapping and restoring stored in the slice mapping table.

15. The target base station of claim 13, wherein the handover request message comprises, when the service slice related to the service provided from the source base station to the UE through the PDU session is not supported by the target base station, an identifier indicating that the service slice is not supported by the target base station, and
the handover request message further comprises, a pair of the service slice and an identifier indicating that the service slice is being mapped in a utility slice of the target base station.

16. The target base station of claim 13,
wherein the target base station maintains the service to the UE by replacing a session for the service slice with a session for the utility slice, and
wherein the target base station stores that the service slice which is not supported by the target base station is being mapped in a utility slice of the target base station.

17. The target base station of claim 16, wherein the session for the utility slice is provided to the UE through a utility data radio bearer (DRB) set by the target base station.

18. The target base station of claim 13, wherein the handover request ACK message comprises a list of PDU sessions admitted by the target base station, and
the service slice is included in the list of admitted PDU sessions, when the service slice related to the service provided from the source base station to the UE through the PDU session is not supported by the target base station.

19. The target base station of claim 13, wherein the target base station maintains the service to the UE by restoring the PDU session, which is mapped to the utility slice in a current source station, to the service slice when the service slice is supported by the target base station, and
wherein the target base station stores the history information that the PDU session is restored to the service slice.

20. The target base station of claim 13, wherein the handover request ACK message comprises a list of PDU sessions admitted by the target base station, and
the service slice is included in the list of admitted PDU sessions, when the service slice related to the service provided from the source base station to the UE through the PDU session is supported by the target base station.

* * * * *